United States Patent
Rothrock

[15] 3,657,510
[45] Apr. 18, 1972

[54] Q-SWITCHED LASER DEVICE FOR ALTERING SURFACES

[72] Inventor: Larry R. Rothrock, Poway, Calif.

[73] Assignee: Union Carbide Corporation, New York, N.Y.

[22] Filed: Nov. 19, 1970

[21] Appl. No.: 91,024

[52] U.S. Cl. ...................................219/121 LA, 331/94.5
[51] Int. Cl. ..................................................B23k 27/00
[58] Field of Search .............219/121 LA, 121 LM; 331/94.5

[56] References Cited

UNITED STATES PATENTS

| 3,136,959 | 6/1964 | Culver | 331/94.5 |
| 3,492,072 | 1/1970 | Haun, Jr. | 331/94.5 X |
| 3,292,102 | 12/1966 | Byrne | 331/94.5 |

Primary Examiner—J. V. Truhe
Assistant Examiner—Hugh D. Jaeger
Attorney—Pastoriza & Kelly

[57] ABSTRACT

A high gain optically pumped Q-switched laser device includes a mask having cutout portions defining a given pattern disposed in the resonant optical cavity defined between end mirrors at opposite ends of the laser material. Each of the end mirrors is equivalent to an optically flat reflecting surface such that only cross-sectional portions in the laser material similar to the pattern are stimulated when the Q of the cavity is restored to emit narrow pulses of output laser radiation. These pulses have high power densities and may be directly radiated to a target surface to alter the surface in a manner corresponding to the given pattern. The alteration may take the form of actual vaporization, heating, chemical reaction, or oxidation of portions of the surface. Thus, carefully controlled engraving type processes or other processes involving a physical alteration of a surface such as the drilling of square or unusually shaped holes are determined by the pattern can be carried out.

11 Claims, 4 Drawing Figures

*INVENTOR.*
LARRY R. ROTHROCK

{ 3,657,510 }

Q-SWITCHED LASER DEVICE FOR ALTERING SURFACES

This invention relates to lasers and more particularly to a novel high gain optically pumped Q-switched laser capable of altering surfaces of target material in accordance with given patterns.

BACKGROUND OF THE INVENTION

It is known in the art to provide light images by disposing a mask in front of output radiation from a laser. The principles involved are substantially the same as in normal light projectors used for projecting slides or motion picture film. In these devices, the entire output radiation impinges upon the mask and the transparent or cutout portions of the mask defining the pattern pass a percentage of the output radiation. While optical imaging of the pattern on the mask is possible with this system, it is very difficult to provide sufficient energy density or power in the image defined by the mask to effect operations other than that of simply imaging a picture. Such operations might include, for example, drilling through a material, effecting a welding along a given pattern as defined by the mask, or imprinting clear patterns on specific types of material such as certain plastics.

The two major difficulties in attempting to perform such operations in accord with a pattern in the mask arises from the fact that, first sufficient energy or power is not available in the beam after it leaves the mask because of the eclipsing which cuts down a large part of the total power available and, second, if the overall power is increased sufficiently to attempt to solve this problem, the mask itself is often subject to destruction.

In simple light imaging systems, it has been proposed to incorporate a mask in the optical cavity of a laser so that the mask itself will not be subject to destruction. Such a system has been described in U.S. Pat. No. 3,293,565 issued to W. A. Hardy for a gas laser wherein curved end mirrors are required in order to effect the lasing action together with a suitable lens to project the image from the system. With such a gas laser, there is not nearly enough output energy in the projected beam to effect physical alteration of a target surface.

In my co-pending application Ser. No. 51,798 filed July 2, 1970 and entitled LASER DEVICE FOR ALTERING SURFACES IN ACCORDANCE WITH GIVEN PATTERNS, there is disclosed a laser device in which a mask defining a desired pattern is placed in the laser cavity but wherein the output power or energy density from the laser is sufficient to effect physical alterations of various surfaces so that drilling and welding operations or engraving type processes on certain materials can readily be carried out.

While my above described laser device is highly successful in many operations, I have discovered that in attempting to alter the surface of certain types of materials in accord with a given pattern, the resulting surface alteration is not as clear or clean cut as would be desired. One such difficult material to deal with is silicone rubber. Another is tetrafluoroethylene resin, commercially produced under the trademark Teflon. This latter plastic is often utilized as wire insulation and normally is difficult to write on or otherwise code. First, the surface itself when intercepting a laser radiated pattern reacts with the light in such a manner as not to provide a clear cut imprinting; rather, the imprinting is fuzzy. Second, in the case of small diameter wires, it is almost impossible to provide a readable code or nomenclature on the limited surface of the Teflon available.

Other materials such as the coatings on certain pharmaceutical products do not react well with the laser radiated pattern when generated by the specific embodiment set forth in my above identified application.

BRIEF DESCRIPTION OF THE PRESENT INVENTION

The present invention contemplates an improved laser device for enabling successful pattern forming on certain materials which cannot easily be treated in accord with the specific embodiment set forth in my above referral to co-pending application.

More particularly, the improved laser device, as in my co-pending application utilizes a high gain optically pumped laser material, preferably a solid state cylindrical crystal. First and second end mirrors define the resonant optical cavity for the laser material, the first end mirror being an optical flat with 100 percent reflectivity or an end mirror means equivalent to such an optical flat, and the second end mirror being optically flat and partially transmissive to couple the laser radiation out of the optical cavity.

A mask having cutout portions or equivalent transparent portions defining a given pattern is positioned in the optical cavity in such a manner that only cross-sectional portions in the laser material or rod itself similar to the pattern are stimulated to emit output laser radiation. The arrangement is as though a plurality of individual laser rods were oriented to define the pattern, each rod operating at full capacity. A Q-switching means is included in the optical cavity so that very narrow, high energy pulses may be generated. When the generated pattern is coupled out of the system, the pulse width and energy density is such as to provide a desired physical alteration on certain target surfaces, such as Teflon, in a clean cut and controllable manner.

In a modified arrangement, as in my co-pending case, the first end mirror means equivalent to an optically flat reflecting surface comprises a diverging lens cooperating with a concave reflecting mirror spaced from the diverging lens and positioned to intercept and return the Q-switched laser pulses back through the diverging lens. By this arrangement, the cutout portions or pattern on the mask may occupy an area substantially greater than the cross-sectional area of the laser material itself.

BRIEF DESCRIPTION OF THE DRAWINGS:

A better understanding of the present improvement will be had by referring to preferred embodiments thereof as illustrated in the accompanying drawings, in which.

DETAILED DESCRIPTION OF THE INVENTION

Figure 1:
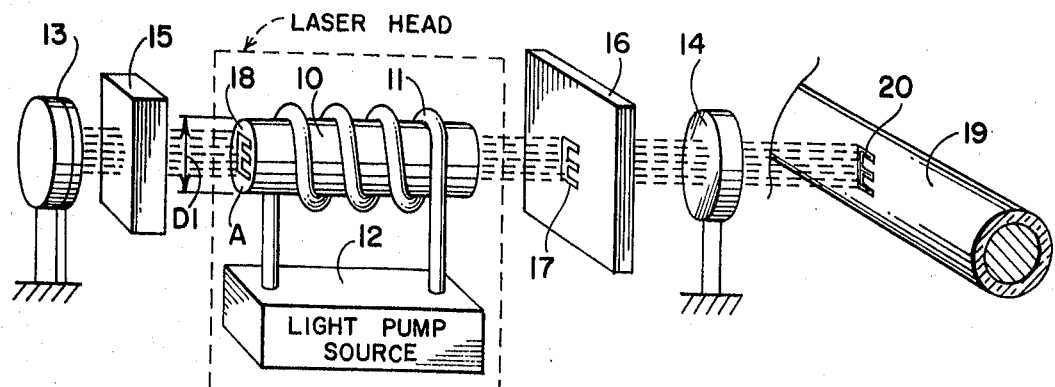
FIG. 1 is a schematic type perspective of a laser device according to the invention.

Referring first to FIG. 1 there is shown a laser material preferably in the form of a crystal rod 10 pumped by any suitable means such as a helical lamp 11 connected to a light pump source 12. Suitable first and second end mirror means 13 and 14 define a resonant optical cavity for the laser material.

In the embodiment of FIG. 1, the first end mirror means constitutes an optically flat mirror providing substantially 100 percent reflectivity for laser radiation while the second end mirror means comprises an optically flat mirror which is partially transmissive to couple the laser radiation out of the optical cavity.

In accord with the invention, a Q-switch 15 is disposed in the optical cavity together with a mask 16 having cutout portions defining a given pattern 17. The Q-switch may constitute a bleachable dye, electro-optic type or mechanical such as a rotating prism, and enables the generation of high energy, narrow output pulses. The mask, in the particular illustration shown has a cutout pattern in the form of the letter E and this pattern falls within an area no greater than the cross-sectional area A of the laser material 10.

With the foregoing arrangement, and assuming that the laser material is light pumped and Q-switched to effect stimulated emission of giant pulses of radiation, such stimulated emission can only occur at cross-sectional portions of the laser material corresponding to the pattern 17. Thus, there is indicated by the shaded end of the crystal rod 10 as at 18 those cross-sectional portions of the laser material which are actually caused to lase. The resulting system would be similar in function to a series of small laser rods in side by side relationship aligned to define the letter E, each rod operating at full capacity.

The resulting laser output beam will have a cross-section corresponding to the pattern 17 and when it strikes a target surface 19, it will actually alter the surface as indicated at 20 in a manner corresponding to the pattern. This alteration may take the form of vaporization, heating, oxidation, or chemical reaction.

It should be understood that while the entire laser crystal material 10 is light pumped, only those cross-sectional portions corresponding to the pattern as shown at 18 will actually lase and since the mask is transparent to those portions there is no possibility of deterioration of other portions of the mask when disposed as shown. Further, some of the light energy pumped into portions of the crystal outside the lasing cross-sectional portions will be utilized in effecting the inverted population levels in those portions which are caused to lase thereby resulting in a very high energy density in those portions of the output beam defining the pattern.

The provision of a Q-switch in combination with the mask in the cavity constitutes the heart of the present invention as it enables the imprinting or engraving of a pattern on certain materials which heretofore could not be successfully marked or have their surfaces altered by a non-Q-switched laser such as a simple cw or pulsed laser. One such material is Teflon and in the example of FIG. 1, this material is shown as the target 19 serving as insulation for a wire.

Figure 2:
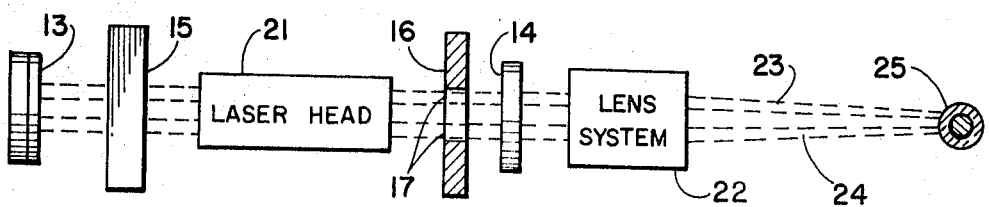
FIG. 2 is a schematic elevational view partly in cross-section illustrating the manner in which a lens system may be employed with the structure of FIG. 1.

FIG. 2 illustrates a system similar to that of FIG. 1 wherein there is provided a laser head 21, first and second end mirrors 13 and 14 with a Q-switch 15 and mask 16 having a cutout pattern 17 disposed in the defined optical cavity. The laser head 20 may contain the same elements 10 and 11 as described in FIG. 1, Q-switch, mask, and pattern being designated by the same numerals used in FIG. 1.

In the embodiment of FIG. 2, there is shown an exterior lens system 22 positioned to intercept the output laser beam of cross-section corresponding to the pattern 17. This lens may be adjusted to enlarge or magnify the final pattern when it strikes a target surface or, alternatively, and as shown in the drawing, may focus down the pattern to a very small geometry for impingement on the target. The numerals 23 and 24 indicate corresponding portions of the pattern on the mask when the lens system has reduced the size of the cross-sectional area. When the cross-sectional area is reduced down by the lens system, a smaller target such as a Teflon coated wire 25 may be easily marked by the giant pulses of radiation generated in the Q-switched laser system.

In some instances, it map be impractical to provide a mask with a pattern wherein the pattern is confined within an area on the mask no greater than the cross-sectional area of the laser material. In this event, a modified system such as illustrated in FIG. 3 may be used.

Figure 3:
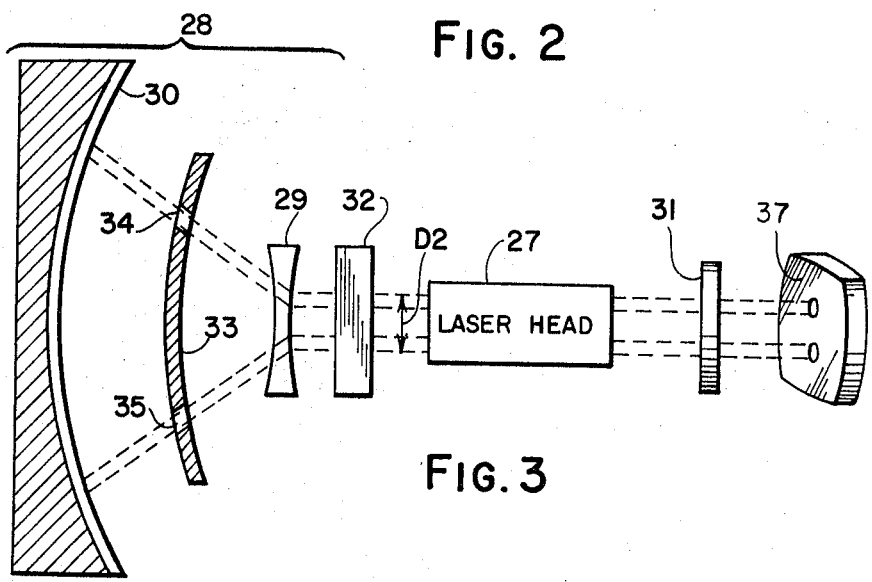
FIG. 3 is a schematic view of a modified laser device according to the invention enabling the use of larger mask structures as compared to that of the device in FIG. 1.

With specific reference to FIG. 3, there is shown a laser head 27, first end mirror means 28 comprising a diverging lens 29 and a concave reflector 30, a second end mirror 31, and a Q-switch 32. The components in the laser head 27 and second end mirror 31 may be the same as the corresponding elements described in FIG. 1. The first end mirror means 28, however, while functioning equivalently to an optically flat end mirror such as the mirror 13 of FIG. 1 enables the use of a larger mask pattern than is possible in FIGS. 1 or 2. Such a larger mask is shown at 33 with cutout portions 34 and 35 constituting part of a pattern. The area of the laser material in the laser head 27 is determined by the diameter of the rod indicated at D2. This diameter may correspond to the diameter D1 of the laser rod of FIG. 1. It is important to note that the cross-sectional area of the laser light leaving one end of the laser rod in the head 27 at the point it passes the diameter arrows D2 is precisely the same as the cross-sectional area of the returning radiation after total reflection from the first end mirror means 28. The first end mirror means 28 comprised of the diverging lens 29 and concave reflector 30 is thus equivalent to an optically flat end mirror as described heretofore.

In FIG. 3, the target indicated at 37 is shown as a pharmaceutical product; for example, a coated pill. In this instance, a careful control of the laser light is necessary to assure a proper reproduction of the pattern on the pill coating. Such proper control is possible with a Q-switched laser since the output pulse frequency and width can be carefully controlled by controlling the Q-switching. The same is true in the systems of FIGS. 1 and 2. However, the arrangement of FIG. 3 permits a larger mask pattern to be utilized.

Figure 4:
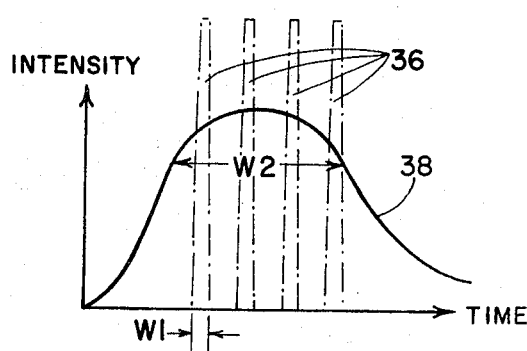
FIG. 4 illustrates the narrow high energy pulses.

FIG. 4 illustrates the difference in pulse shape when using a Q-switched laser as compared to a pulsed laser. Thus, the solid curve 38 represents a relatively wide pulse of radiation of width W2 as would result from a pulsed laser, such as in my heretofore mentioned co-pending application. While this type of pulse works well in altering surfaces of many materials, it does not provide a clean cut or clear pattern on certain other materials such as Teflon as heretofore described.

The dotted pulses 36 represent substantially narrower pulses of width W1 generated by the Q-switching technique. The pulses may be several as shown, or only one. It will be evident that a greater power density is realizable. Further, it will be clear that by controlling the Q-switching, the number of such narrow pulses per unit time striking the target material can be controlled. Highly successful marking of materials such as Teflon as described in FIGS. 1 and 2 or pharmaceutical coatings as described in FIG. 3 are thus possible with the Q-switching technique.

OPERATION

The operation of the laser device of this invention will be apparent from the foregoing description. Should it be desired to code a Teflon material in accordance with a given pattern, such pattern is formed on the mask such as the mask 16 of FIG. 1 so that only corresponding cross-sectional portions of the laser rod 10 will lase. Impingement of the output pulses properly controlled by Q-switching on the Teflon will thus result in carbonization of the surface to provide a clear imprint of a desired pattern or code.

If it is desired that the altered surface of the target follow a similar pattern but which similar pattern is smaller, the lens system described in FIG. 2 may be utilized.

Finally, if it is not feasible to provide a pattern which can be encompassed within an area on the mask corresponding to the cross-sectional area of the laser material, the modified structure of FIG. 3 may be utilized.

In all cases, the very high energy narrow output pulses effect the desired alteration of the target surface as opposed to mere optical imaging.

While the mask structures have been described as having cutout portions defining the pattern, it will be evident that equivalent patterns can be formed by providing portions that are simply transmissive to the particular wave length involved. The term "cutout portions" is meant to include any equivalent means of defining patterns on the mask for realizing the desired ends.

What is claimed is:

1. A Q-switched laser device for altering the surface of a target material to define a given pattern comprising, in combination:
 a. a high gain optically pumped laser material;
 b. first and second end mirror means defining a resonant optical cavity for said laser material, said first end mirror means providing substantially 100 percent reflectivity for laser radiation without changing the cross-sectional area of said radiation at the point it leaves one end of said laser material and returns to said one end, said second end mirror means being optically flat and partially transmissive to couple the laser radiation out of said optical cavity;

c. a Q-switching means for switching the Q of said resonant optical cavity to enable the generation of narrow high energy pulses of radiation; and d. a mask having cutout portions defining said given pattern, said mask being positioned in said optical cavity such that only cross-sectional portions in said laser material similar to said pattern are stimulated to emit output laser radiation, whereby an exterior target surface may be radiated by said output laser radiation to thereby effect physical alteration of said surface similar to said given pattern.

2. A device according to claim 1, including an exterior lens system between said second end mirror means and said target surface for changing the size of the cross-section of said output laser radiation defining said given pattern whereby a smaller or larger similar pattern of altered surface portions can be formed on said target surface.

3. A device according to claim 1, in which said first end mirror means comprises an optically flat mirror, the overall outer dimensions of the pattern defined by the cutout portions of said mask being such that said pattern falls within an area no greater than the cross-sectional area of said laser material, the cross-sectional portions in said laser material that are stimulated being congruent with the cutout portions on said mask defining said pattern.

4. A device according to claim 1, in which said first end mirror means includes a diverging lens for expanding said laser radiation after it leaves said one end of said laser material and passes said point; and a concave reflecting mirror spaced from said diverging lens and positioned to intercept and return the laser radiation back through said expanding lens so that when the radiation passes said point to return to said one end, it is of the same cross-sectional area as when it left, said mask being positioned between said diverging lens and said concave mirror, whereby the cutout portions on said mask defining said pattern may occupy an area substantially greater than the cross-sectional area of said laser material.

5. A device according to claim 1, in which said laser material comprises a solid state crystal in the shape of a solid cylindrical rod.

6. A device according to claim 1, in which said exterior target surface is Teflon.

7. A device according to claim 1, in which said exterior target surface is a pharmaceutical coating.

8. A device according to claim 1, in which said exterior target surface is silicone rubber.

9. A process for altering the surface of a material to define a given pattern comprising:

positioning, in the resonant optical cavity of a laser containing a high gain optically pumped laser material and having a substantially 100 percent reflective first end mirror means and a partially transmissive second end mirror means, a mask having cutout portions defining said given pattern so that only cross-sectional portions in said laser material similar to said pattern are stimulated to emit output laser radiation;

providing said laser with a Q-switching means for switching the Q of said resonant optical cavity to enable the generation of narrow high energy pulses of output laser radiation;

producing in said optical cavity laser radiation having the same cross-sectional area upon leaving, being reflected by said first end mirror means, and returning to the end of said laser material;

coupling said pulses of laser output radiation out of said cavity through said second end mirror means; and impinging said pulsed output laser radiation on the surface of said material to thereby effect physical alteration of said surface similar to said given pattern.

10. Process in accordance with claim 9 which additionally comprises:

positioning a lens system between said laser and said surface for changing the size of the cross-section of said output laser radiation; and passing said output laser radiation through said lens system prior to impingement on said surface to effect a smaller or larger similar pattern of altered surface portions on said surface.

11. Process in accordance with claim 9, in which said laser material comprises a solid state crystal in the shape of a solid cylindrical rod.

* * * * *